United States Patent
Conrady et al.

(10) Patent No.: US 7,211,915 B2
(45) Date of Patent: May 1, 2007

(54) MOTOR ASSEMBLY USING REDUNDANT BEARINGS AND SUPPORT ELEMENTS

(75) Inventors: Clint Edward Conrady, Fort Collins, CO (US); Ronald Paul Dean, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 70 days.

(21) Appl. No.: 10/687,388

(22) Filed: Oct. 15, 2003

(65) Prior Publication Data

US 2005/0082927 A1   Apr. 21, 2005

(51) Int. Cl.
*H02K 7/08* (2006.01)
*H02K 9/00* (2006.01)

(52) U.S. Cl. .............. 310/90; 310/62; 310/63; 417/354; 417/353; 417/352; 384/461

(58) Field of Classification Search .......... 310/90; 417/354, 423.12; 384/461
See application file for complete search history.

(56) References Cited

U.S. PATENT DOCUMENTS

| | | | | |
|---|---|---|---|---|
| 596,310 A | * | 12/1897 | Thomas | 384/461 |
| 3,547,503 A | * | 12/1970 | Konet | 384/461 |
| 4,686,400 A | * | 8/1987 | Fujisaki et al. | 310/67 R |
| 4,868,436 A | * | 9/1989 | Attilio et al. | 310/67 R |
| 5,138,477 A | * | 8/1992 | Omura et al. | 359/200 |
| 5,500,780 A | * | 3/1996 | Boutaghou et al. | 360/99.08 |
| 5,920,264 A | | 7/1999 | Kim et al. | 340/584 |
| 5,982,064 A | * | 11/1999 | Umeda et al. | 310/90 |
| 6,011,689 A | | 1/2000 | Wrycraft | 361/695 |
| 6,379,129 B1 | * | 4/2002 | Obara | 417/423.12 |
| 6,511,303 B2 | * | 1/2003 | Obara | 417/423.12 |
| 6,598,720 B2 | * | 7/2003 | Ritter et al. | 192/48.2 |
| 6,741,428 B1 | * | 5/2004 | Oveyssi | 360/265.6 |
| 2003/0123767 A1 | * | 7/2003 | Fite et al. | 384/461 |

FOREIGN PATENT DOCUMENTS

JP          04008143 A  *  1/1992

\* cited by examiner

*Primary Examiner*—Dang Le
*Assistant Examiner*—Yahveh Comas

(57) ABSTRACT

A motor assembly comprises a plurality of redundant bearings, a plurality of coaxial support elements, with at least one of the support elements rotatable about an axis of rotation, and an armature rotatably guided by the plurality of support elements to rotate about the axis of rotation. The bearings provide redundancy to continue armature rotation in the event one bearing fails.

4 Claims, 3 Drawing Sheets

MOTOR ASSEMBLY USING REDUNDANT BEARINGS AND SUPPORT ELEMENTS

BACKGROUND OF THE INVENTION

1. Field of the Invention

This invention relates to electric systems, and more particularly to motor assemblies.

2. Description of the Related Art

Electric motor driven fans have become an integral part of design for thermal management in electronics. These fans, typically used to cool heat generating components in computer servers, personal computers (PCs) and other electronics, play a critical role in system reliability and longevity. Typical fans have stator windings ("stators"), a single bearing sleeve and a shaft. The stators induce rotor magnets ("rotors") on a blade assembly armature 130 to rotate, causing air movement through the fan. Various types of fans are used to cool heat generating components, including tube-axial, vane-axial, centrifugal, and blower fans. Regardless of the type of fan used, motor and bearing failures must be minimized to enhance reliability and longevity.

One approach to reduce the impact of motor and bearing failures is described by D. Kim et al. in U.S. Pat. No. 5,920,264. Thermal conditions around the system's cooled parts are monitored to provide a warning should overheating develop. When the temperature around the monitored parts increases past a predetermined level, an alarm sounds from a speaker so that a user can stop the power supplied to the system. Another solution is presented by S. Wrycraft in U.S. Pat. No. 6,011,689 in which an array of fans arranged in parallel cool components in a computer system. Each fan includes an airflow closure member that closes upon failure of the fan. The closure prevents cool air from escaping through the failed fan prior to flowing over a component to be cooled. In this manner, a fan suffering from a failed motor or bearing will not adversely affect the performance of the other fans in the array.

Another solution to reduce the impact of motor and bearing failures is to use multiple fans in series. Unfortunately, this arrangement produces undesirable turbulence noise and increased system impedance if one of the fans should fail. Fan redundancy, either with fans positioned in parallel or series, also reduces the space available for other components and increases system cost due to the increased parts count.

A need continues to exist, therefore, for a motor assembly with increased reliability and longevity without increasing noise, system cost or reducing space available for other components.

SUMMARY

A motor assembly is described, in one embodiment, comprising a plurality of redundant bearings, a plurality of coaxial support elements, with at least one of the support elements rotatable about an axis of rotation, and an armature rotatably guided by the plurality of support elements to rotate about the axis of rotation. The bearings provide redundancy to continue armature rotation in the event one bearing fails.

Another embodiment is described that has a rotational shaft, an inner sleeve surrounding the rotational shaft, an outer sleeve surrounding the inner sleeve, a first bearing between the shaft and inner sleeve, and a second bearing between the inner and outer sleeves, so that the sleeve and bearing combinations provide redundancy for continued shaft rotation in case of failure of one of the bearings.

BRIEF DESCRIPTION OF THE DRAWINGS

The components in the Figures are not necessarily to scale, emphasis instead being placed upon illustrating the principles of the invention. Moreover, in the Figures, 'like' reference numerals designate corresponding parts throughout the different views.

DETAILED DESCRIPTION

Motor reliability and longevity are increased, particularly for fan motors used to drive fans in computer systems, by providing redundant bearings, support elements and motors. In one embodiment, inner and outer sleeves guide a coaxial shaft and provide redundancy for the shaft to rotate about its axis with respect to either one or both of the sleeves. The blades connect to the shaft and are rotated by a plurality of motors that provide redundancy in case of a failure of any one motor.

Figure 1:
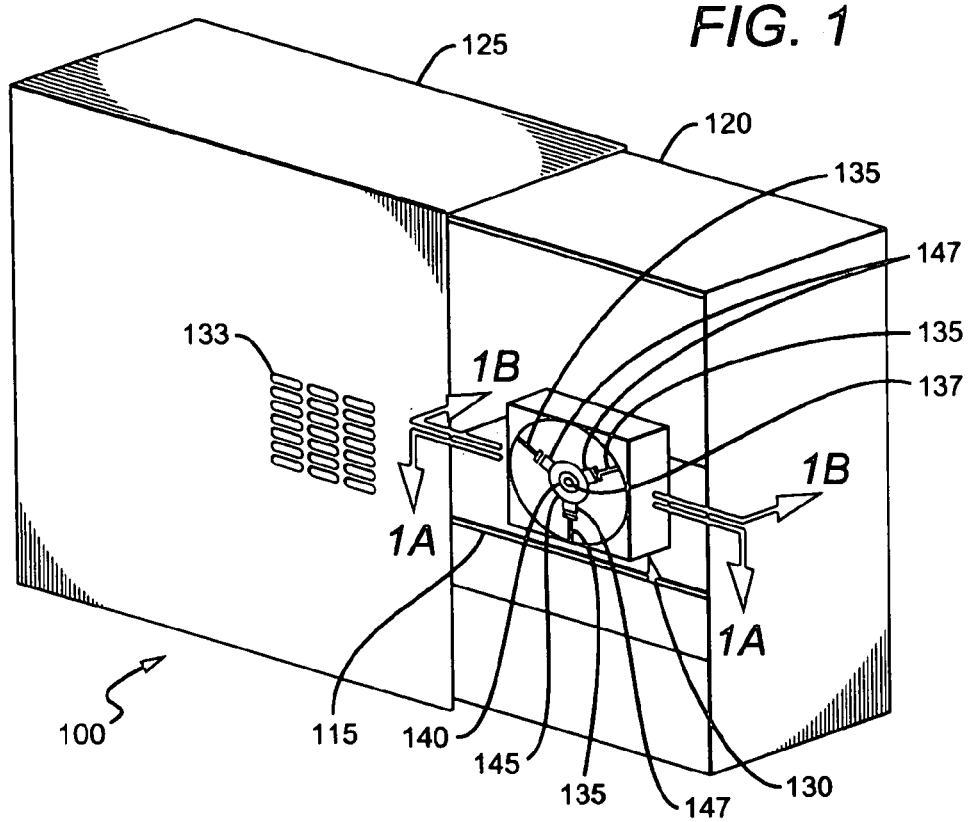
FIG. 1 is a perspective view of one embodiment of the invention that uses multiple coaxial sleeves, redundant stators and an armature to guide the rotation of blades in a fan for use in a computer system.

FIG. 1 illustrates a personal computer (PC) 200, in one embodiment of the invention, having a chassis 115 mounted on an inner housing 120. The chassis 115 is designed to support various components, such as a processor motherboard and peripherals. The inner housing 120 is shown in its open position, pulled out from the interior of an outer housing 125 to allow user access to the chassis 115. A fan 230 is either supported by the chassis 115 or attached to adjacent ventilation openings 133 in the outer housing 125. The ventilation openings 133 either accept cool air from the exterior of the PC or allow component-heated air to escape, depending on the orientation of the fan 130, when the inner housing 220 is closed. Blades 135 of the fan 130 are carried by a shaft 137 that is supported by an inner sleeve 140 and an outer sleeve 145 and rotates with respect to either the inner or outer sleeves (140, 145). Stators 147, such as motor windings, are mounted to the outer sleeve 145 to induce the blades to rotate.

Although a desktop computer is illustrated, the fan could be used to cool other components such as a server or laptop computer, or non-computer applications such as automobiles, buildings, or machines. The fan 130 would normally be positioned adjacent ventilation openings 133 to either push air into or pull air out of the enclosure.

Figure 1B:
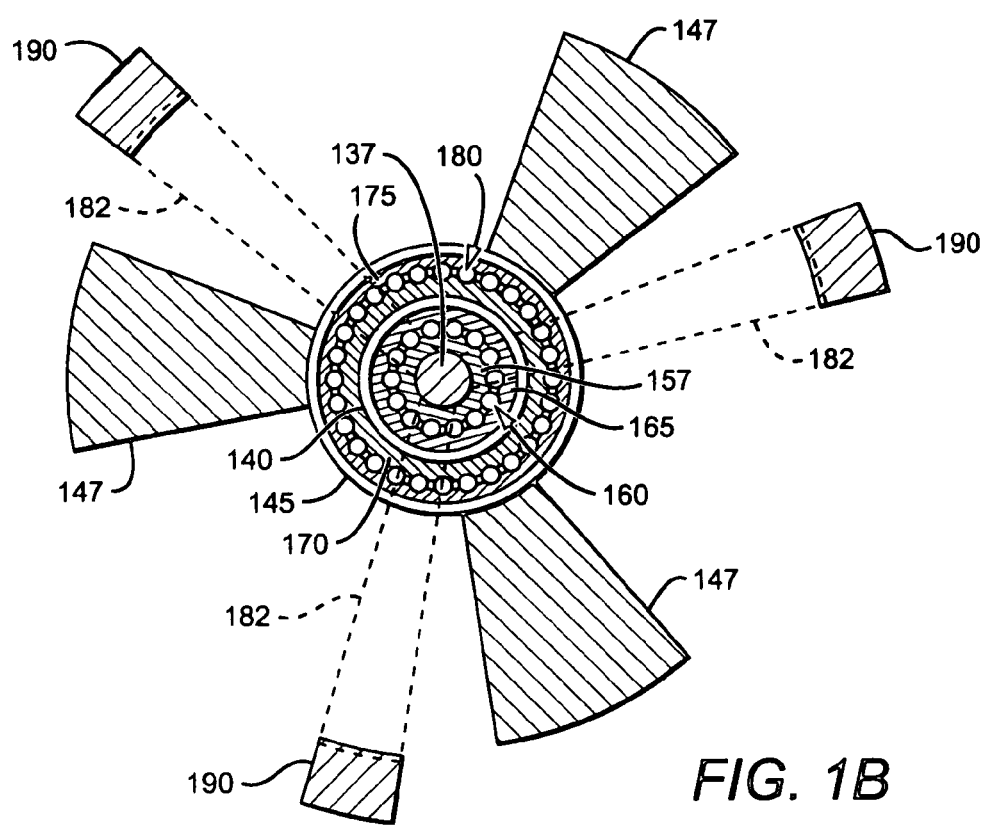
FIG. 1B is a cross-section view of the embodiment of the invention shown in FIG. 1 along the line 1B—1B.
Figure 1A:
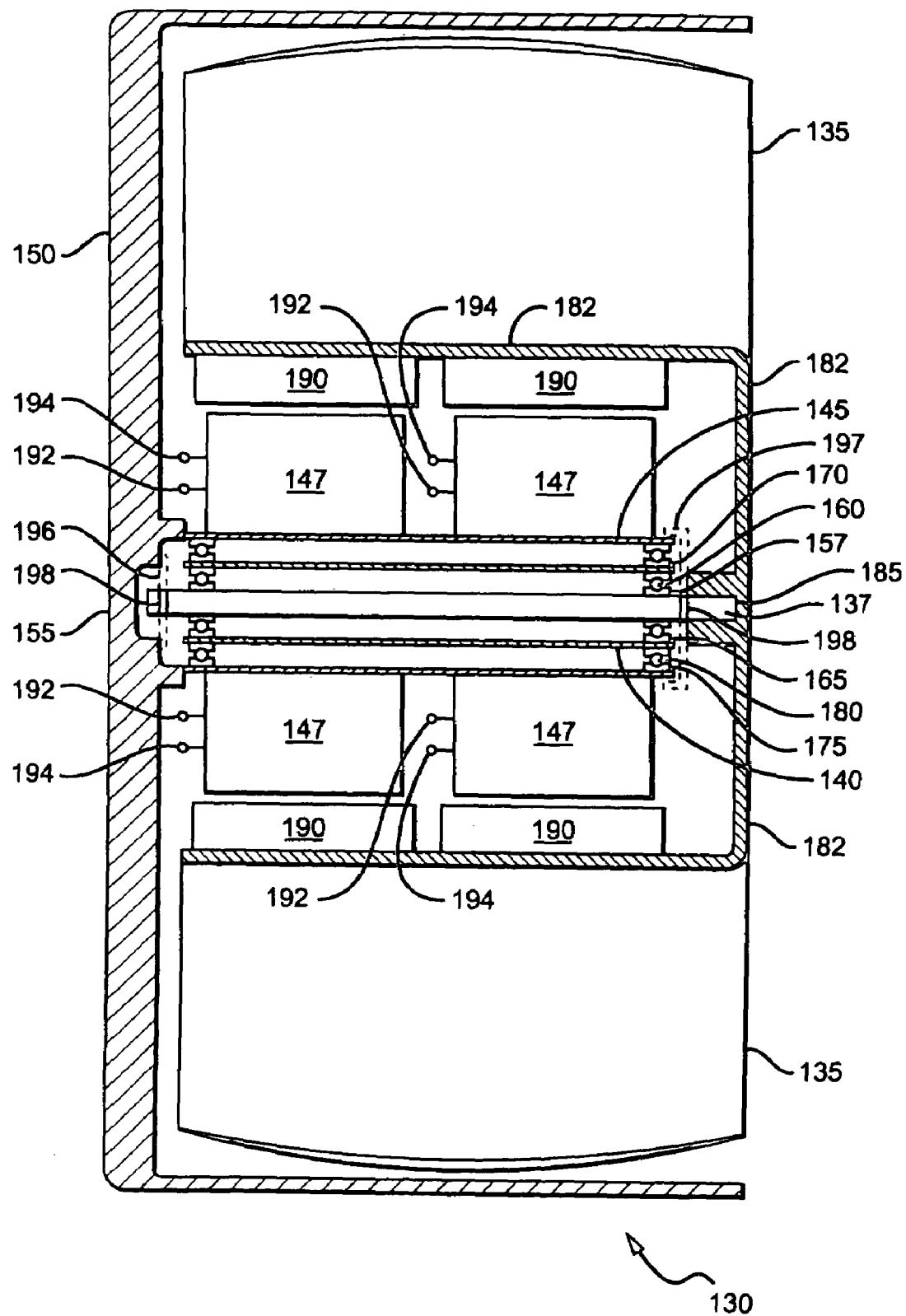
FIG. 1A is a cross-section view of the embodiment of the invention shown in FIG. 1 along the line 1A—1A.

Referring now to FIGS. 1A and 1B, a frame 150 supports a hub 155 that contains electronics (not shown) for electrical control of the fan 130. The outer sleeve 245 is attached to the hub 155 to support the inner sleeve 140 and shaft 137 assembly, both of which are located coaxially with the outer sleeve 145.

A plurality of shaft races 157 are provided in the inner sleeve 140 circumferentially around the shaft 137. As illustrated, each shaft race 157 is configured to accept inner bearings 160 to enable easy shaft rotation with respect to the sleeves (140, 145). As illustrated in FIGS. 1A and 1B, the bearings can be ball or roller bearings 160 housed in shaft races 157 in the inner sleeve adjacent the shaft. Alternatively, the bearings could be implemented as air bearings or sleeve bearings. If designed for use with air bearings, the shaft races 157 would be replaced with an air-bearing pad extending circumferentially and longitudinally about the shaft 137 and would include orifice, porous-wall or compound compensation. The inner sleeve 140 has a plurality of first-inner races 165 on its face opposing the shaft 137 that are complementary to the shaft races 157, as described above. The races (157, 165) and inner bearings 260 allow the shaft 137 to rotate freely with respect to the inner sleeve 140.

A plurality of second-inner races 170 are located on the opposite face of the inner sleeve 140 and, as described above for the first-inner races 165, can accept ball bearings, roller bearings or are designed as sleeve or air bearings (ball bearings are illustrated in FIGS. 1A and 1B). The outer sleeve 145 has outer races 175 that are complementary to the second-inner races 170 to accept outer bearings 180 such as those described for the shaft and first-inner races (157, 165). Rotation of the outer bearings 180 between the outer and second-inner races (175, 170) allows the inner sleeve 140 to rotate freely with respect to the fixed outer sleeve 145.

The inner and outer sleeves (140, 145), used in combination with the races (157, 165, 170, 175) and bearings (160, 180), allow rotation of the shaft 137 even if either the inner or outer bearings (160, 180) fail. For example, if the inner bearings 160 fail, friction would increase between the shaft 137 and inner sleeve 140, but the outer bearings 180 would allow the shaft 137 and inner sleeve 140 assembly to rotate freely. If the outer bearings 180 fail, friction would increase between the inner and outer sleeves (140, 145), but the inner bearings 160 would allow the shaft 137 to continue rotation. In either case, reliability and longevity of the bearings are improved.

Although it is possible to design a fan 130 having only one fan blade, the shaft 137 is connected to, preferably, at least two fan blades 135. The blades 135 connect to the shaft 137 through an armature 182 having a recess 185 for accepting the shaft 137 using a pressed friction fit, adhesive, fixed pin, or through a non-recess attachment point. If a non-recessed attachment point is used, the shaft 137 and armature 182 can be molded as one piece or connected together using methods similar to those described for the recess 185. The stators 147 are mounted to the outer sleeve 145 opposite rotors 190. The separate rotors 190 on the armature 182 may be combined into a single long rotor to facilitate manufacturing. Redundant mechanisms are used to produce the electric field for rotational movement of the blades 135 about an axis defined by the shaft 137. Either the rotors 190 or the stators 147 can generate the required electric field. If the stators 147 provide the field, each stator has inputs 192 and outputs 194 to receive a current to produce the field, and at least one fan blade 135 has an opposing rotor 190, such as a magnet or electromagnet.

If either of the race pairs (157/165 and 170/175) accept ball bearings, that pair provides resistance to longitudinal motion of the assembly by the bearing seat in their generally cylindrical surfaces. If either of the race pairs is designed for an air bearing or sleeve-bearing configuration, the shaft 137 would receive a shaft-retaining ring 296 and/or an inner-sleeve ring 197 to mate with complementary shaft grooves 198 to resist longitudinal movement of the inner sleeve 140 and shaft 137. Although the fan 130 has been described with only the shaft 137 rotating during normal operation, in an example, rotation would also be imparted on the inner sleeve 140 through friction between the inner bearing 160 and first inner race 165. Also the number and type of races used in the inner and outer sleeves (140, 145) would be complementary to the type of bearings used.

Figure 2:
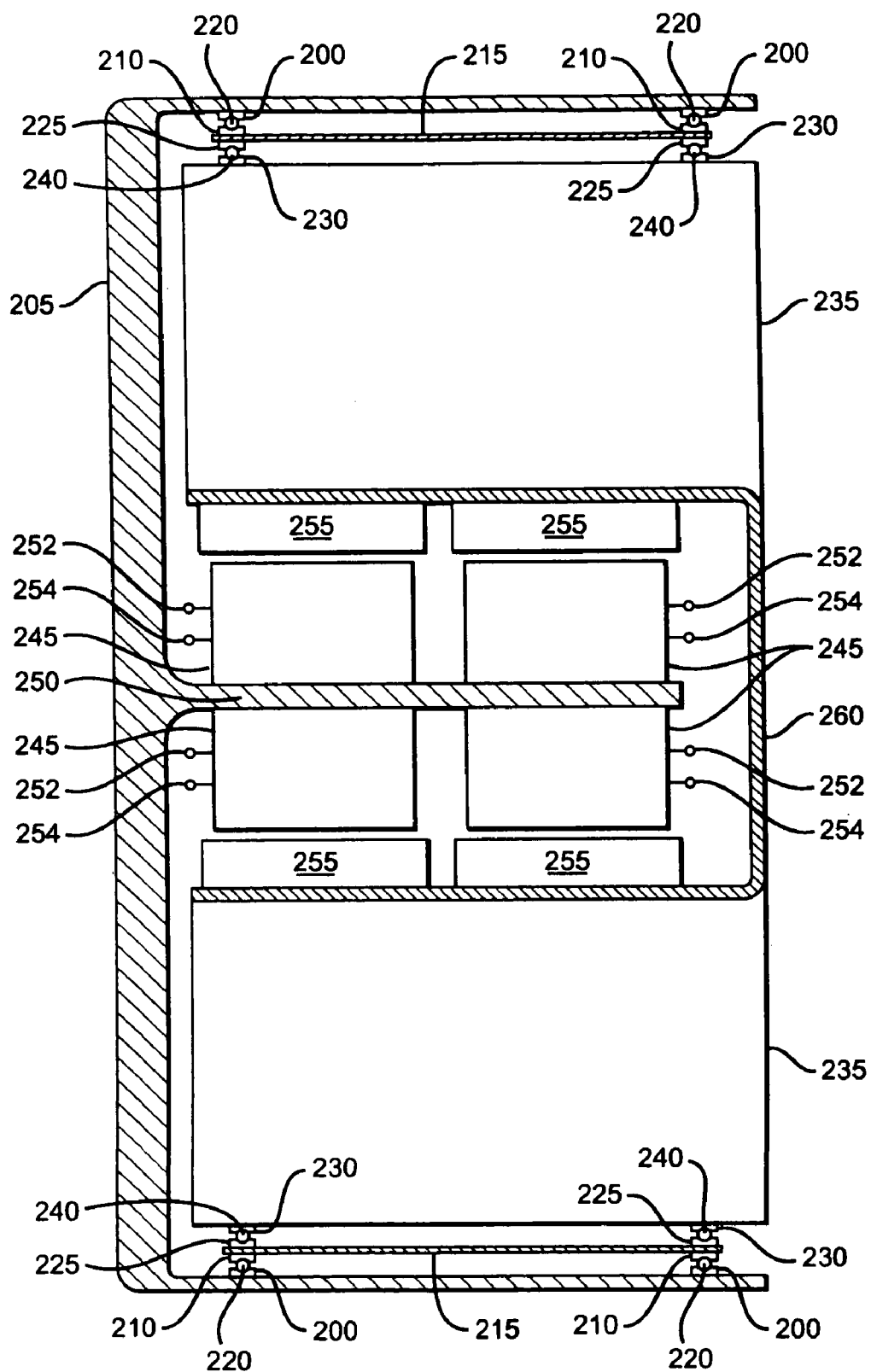
FIG. 2 is a cross-section view of one embodiment that has a single centripetal sleeve, a housing with races and redundant stators, without the use of a shaft, to guide blade rotation.

FIG. 2 illustrates an embodiment using redundant bearings and stators without the use of a concentric shaft. A plurality of housing races 200 are attached to an interior portion of a housing 205 and positioned opposed to, and in complementary fashion with, first-centripetal races 210 attached to a face of a centripetal sleeve 215. The centripetal sleeve 215 is coaxial with the housing 205. As described above for the races in FIGS. 1A and 1B, the races accept either ball bearings, roller bearings or are designed for an air or sleeve-bearing configuration (collectively "housing bearings 220"). The races (200, 210) allow rotational movement of the centripetal sleeve along the interior portion of the fan housing 205 while limiting longitudinal movement.

On the opposite face of the centripetal sleeve 215 are attached a plurality of second-centripetal races 225 positioned opposed to and in complementary fashion with blade races 230 attached to the distal end of each blade 235. The second centripetal and blade races (225, 230) also accept ball bearings, roller bearings or are modified for an air or sleeve-bearing configuration (collectively "blade bearings 140"). Rotation of the blade bearings 240 allows the blades 335 to rotate with respect to the centripetal sleeve 215.

Motion is imparted to the blades 235 using redundant stators 245, such as motor windings, connected to an interior portion 250 of the housing 205. Each stator has inputs 252 and outputs 254 to receive a current to produce the field. The stators 245 provide an electromotive force to rotors 255, which are either magnets or electromagnets, positioned opposite the stators 245 and connected to the blades 235. The blades are connected together using an armature 260. With this arrangement, a concentric shaft is not needed to guide the blades 235. The housing 205 and centripetal sleeve 215, used in combination with the races (200, 210, 225, 230) and bearings (220, 240), allow rotation of the blades even if one of either the housing or blade bearings fail (220, 240). For example, if the blade bearings 240 fail, the blades 235 and centripetal sleeve 215 would rotate with respect to the housing 205. If the housing bearings 210 fail, only the blades 235 would rotate with respect to the housing 205. In either case, reliability and longevity of the bearing action is improved.

We claim:

1. A motor assembly, comprising:
    a plurality of redundant bearings;
    a plurality of coaxial support elements, comprising
        a housing containing an armature and said plurality of redundant bearings with at least one of said support elements rotatable about an axis of rotation, said armature rotatably guided by said plurality of support elements to rotate about said axis of rotation; and
        a centripetal sleeve adapted to rotate about an axis within said housing and being guided by at least one of said redundant bearings;
    a plurality of blades coupled to said armature, each of said blades being adapted to rotate about said axis within said centripetal sleeve;
    at least one rotor element connected to said armature; and
    redundant stators connected to an interior portion of said housing opposed to and in a complementary position with respect to said at least one rotor element;

so that application of an electromotive force between said rotor and stators induces said blades to rotate even if one of the stators fails.

2. The assembly of claim 1, wherein said rotor comprises a magnet.

3. The assembly of claim 1, wherein said rotor comprises a motor winding.

4. A computer apparatus, further comprising:

a computer casing;

a fan in said computer casing, said fan comprising at least one fan blade;

inner and outer coaxial sleeves supporting said at least one fan blade to enable it to rotate independent of the rotation of said inner and outer sleeves;

a magnet connected to said fan blade;

a motor winding opposed to and in a complementary position with respect to said magnet; and a fan housing having inner and outer portions, said outer portion adapted to guide said outer coaxial sleeve and said inner portion coupled to said motor winding;

said fan blades rotating in response to said motor winding producing an electromotive force on said fan blades.

* * * * *